US010390233B2

(12) United States Patent
Van Phan et al.

(10) Patent No.: US 10,390,233 B2
(45) Date of Patent: Aug. 20, 2019

(54) FREQUENCY BAND SHARING AMONGST CELLS (71) Applicant: NOKIA SOLUTIONS AND NETWORKS OY, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 104 days.

(21) Appl. No.: 15/306,333

(22) PCT Filed: May 23, 2014

(86) PCT No.: PCT/EP2014/060663
§ 371 (c)(1),
(2) Date: Oct. 25, 2016

(87) PCT Pub. No.: WO2015/176771
PCT Pub. Date: Nov. 26, 2015

(65) Prior Publication Data
US 2017/0048722 A1 Feb. 16, 2017

(51) Int. Cl.
*H04W 72/04* (2009.01)
*H04W 16/16* (2009.01)
*H04W 16/14* (2009.01)

(52) U.S. Cl.
CPC ....... *H04W 16/16* (2013.01); *H04W 72/0453* (2013.01); *H04W 16/14* (2013.01)

(58) Field of Classification Search
CPC .. H04W 16/16; H04W 72/0453; H04W 16/14
See application file for complete search history.

(56) References Cited

U.S. PATENT DOCUMENTS

| 2009/0132675 A1* | 5/2009 | Horn | H04W 8/26 709/207 |
| 2011/0098055 A1* | 4/2011 | Kwon | H04W 52/08 455/452.2 |
| 2011/0151886 A1* | 6/2011 | Grayson | H04W 16/04 455/452.1 |
| 2012/0129527 A1* | 5/2012 | Takeuchi | H04W 36/20 455/436 |

(Continued)

FOREIGN PATENT DOCUMENTS

| EP | 2635064 A1 * | 9/2013 | ........... H04W 24/02 |
| WO | 2009132709 A1 | 11/2009 | |

(Continued)

OTHER PUBLICATIONS

International Search Report and Written Opinion for PCT Application PCT/EP2014/060663, dated Apr. 22, 2015, 12 pages.

*Primary Examiner* — Jay P Patel
(74) *Attorney, Agent, or Firm* — Brake Hughes Bellermann LLP (57) ABSTRACT

Example implementations are described related to a dynamic resource allocation scheme for use in allocating frequency resources from a frequency band shared by a plurality of small area cell base stations located in a service area of a large area cell base station. The large area cell base station may control the dynamic resource allocation from the shared frequency band.

20 Claims, 6 Drawing Sheets

(56) References Cited

U.S. PATENT DOCUMENTS

| | | | |
|---|---|---|---|
| 2013/0201966 A1* | 8/2013 | Weng | H04W 72/04 370/336 |
| 2013/0279376 A1 | 10/2013 | Ahmadi et al. | |
| 2013/0343291 A1* | 12/2013 | Gao | H04W 52/244 370/329 |
| 2014/0187251 A1* | 7/2014 | Viswanathan | H04W 72/082 455/450 |
| 2014/0226609 A1* | 8/2014 | Hooli | H04W 16/14 370/329 |
| 2014/0302868 A1* | 10/2014 | Miki | H04W 72/087 455/452.2 |
| 2014/0349659 A1* | 11/2014 | Ishii | H04W 76/10 455/444 |
| 2015/0023309 A1* | 1/2015 | Wu | H04W 52/244 370/329 |
| 2015/0024765 A1* | 1/2015 | Xu | H04W 92/20 455/450 |
| 2015/0110065 A1* | 4/2015 | Gaal | H04W 16/14 370/330 |
| 2015/0133131 A1* | 5/2015 | Van Phan | H04W 88/04 455/450 |
| 2015/0334717 A1* | 11/2015 | Rashid | H04W 72/0493 370/329 |
| 2015/0373554 A1* | 12/2015 | Freda | H04W 16/14 455/450 |
| 2016/0037523 A1* | 2/2016 | Wei | H04W 24/02 370/329 |
| 2016/0094999 A1* | 3/2016 | Yu | H04W 16/14 455/454 |
| 2016/0242031 A1* | 8/2016 | Ojanen | H04W 28/16 |
| 2016/0295418 A1* | 10/2016 | Yilmaz | H04W 16/32 |

FOREIGN PATENT DOCUMENTS

| | | |
|---|---|---|
| WO | 2010040412 A1 | 4/2010 |
| WO | 2013126843 A2 | 8/2013 |

\* cited by examiner

FREQUENCY BAND SHARING AMONGST CELLS

This application is a national stage entry of PCT Application No. PCT/EP2014/060663, filed May 23, 2014, entitled "FREQUENCY BAND SHARING AMONGST CELLS" which is hereby incorporated by reference in its entirety.

FIELD

The invention relates to the field of wireless communication systems and, particularly spectrum sharing in such systems.

BACKGROUND

Spectrum sharing is a common feature on unlicensed frequency bands where two different wireless networks may occupy the same frequency band without any regulation. With respect to licensed frequency bands, each operator has conventionally been assigned with a dedicated frequency band. From the point of view of efficient spectrum utilization, sharing spectrum on licensed frequency bands may be advantageous.

BRIEF DESCRIPTION

The invention is defined by the independent claims.
Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
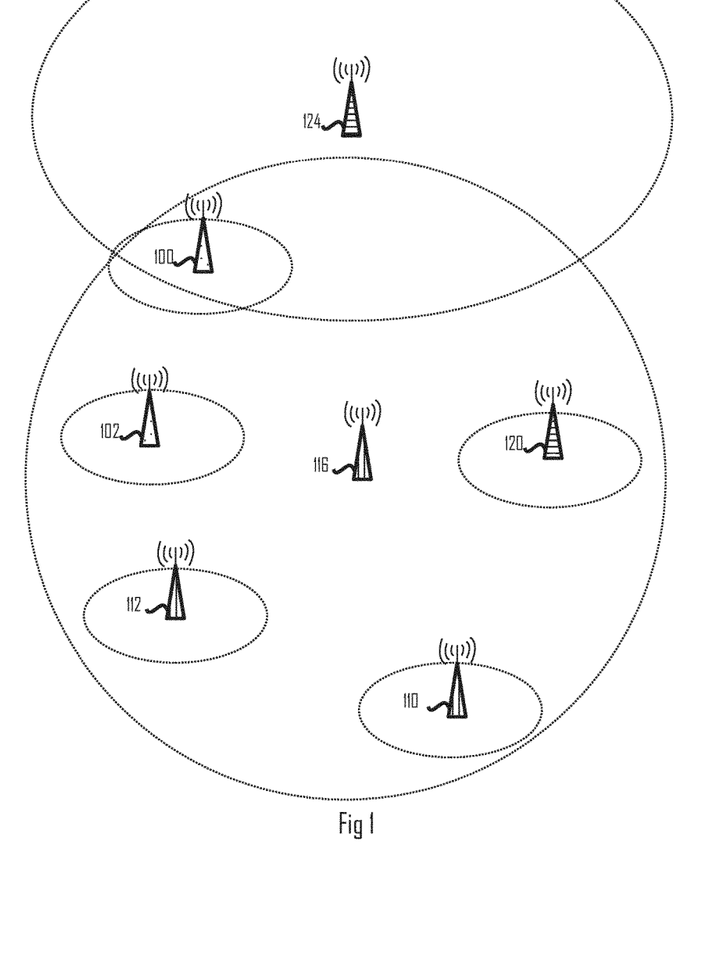
FIG. 1 illustrates a wireless communication scenario to which embodiments of the invention may be applied.

FIG. 1 illustrates a wireless communication scenario to which embodiments of the invention may be applied. Referring to FIG. 1, cellular communication networks of different operators have typically overlapping coverage areas. Base stations of different operators are illustrated in FIG. 1 with different filling patterns. For example, base stations 100, 102 marked with dots represent base stations of a cellular communication system operated by a first operator, base stations 110, 112, 116 marked with vertical lining represent base stations of a cellular communication system operated by a second operator, and base stations 120, 124 marked with horizontal lining represent base stations of a cellular communication system operated by a third operator. The cellular communication systems may operate according to specifications of the $3^{rd}$ Generation Partnership Project (3GPP) Long-Term Evolution (LTE) Advanced or its evolution version having cognitive radio (CR) aspects. The cellular communication systems may support co-primary spectrum sharing as a flexible spectrum management and dynamic access scheme with cognitive radio technology. The co-primary spectrum sharing refers to a spectrum access model where two or more primary license holders (e.g. the network operators providing similar radio services) agree on joint use of at least a portion of their licensed spectrum. The exact usage conditions (policies) may be laid down in a mutual agreement, and the entire model may be subject to permission by a national regulator. The regulator may allocate a part of spectrum not exclusively to a single operator but jointly to several potential users (operators) with the obligation to use it collectively under fair conditions and subject to certain rules. The co-primary spectrum sharing will provide more dynamic spectrum sharing between operators providing the same/similar radio services.

The co-primary spectrum sharing together with cognitive radio access procedures may enable higher peak data rates for end users as well as higher capacity in the cellular communication systems, a natural result of increased bandwidth. Such shared spectrum usage seems especially beneficial and appropriate for small area cell deployments because these are usually more isolated than large area cells such as macro cells. The small cells may refer to micro cells, pico cells, and/or femto cells or other types of cells configured to provide radio coverage on a very small area (e.g. a hotspot) compared with the coverage area of macro cell which may span over several square miles. The local area deployments among different operator networks are very much location-dependent. It may not be most favorable to have static spectrum allocation policies among different operators, which is often applied commonly over the whole network area.

In FIG. 1, there are illustrated two large area cell base stations 116, 124 and a plurality of small area cell base stations 100, 102, 110, 112, 120 located within a coverage or service area of a large area cell base station 116. One small area cell base station 100 may be located within a service area of both large area cell base stations 116, 124. In reality, the number of base stations may be higher and a plurality of large area cell base stations may surround the base stations depicted in FIG. 1, and the embodiments of the invention are applicable to such other scenarios as well. However, let us concentrate on the scenario of FIG. 1 for the sake of simplicity.

Embodiments of the invention may be applied to a situation where co-primary spectrum sharing of secondary carrier(s) is used for high-density small area cells of different operators' networks deployed in hot-spot places such as exhibition sites, super shopping malls, or indoor residential or office buildings. It may be assumed that there is macro-layer coverage deployed with a large area cell 116 of at least one operator over the local area of interest for providing e.g. common synchronization reference, coordination and control for local co-primary sharing small area cells or small area base stations 100, 102, 110, 112, 120. A question in such a situation is how the small area base stations of different operators may be coordinated and controlled to share the common spectrum resources of secondary carrier(s) in a fast (e.g. in range of tens of milliseconds), simple and effective fashion. Ensuring fairness in the resource reservation and sharing for the small area cell base stations would also be advantageous.

Figure 2:
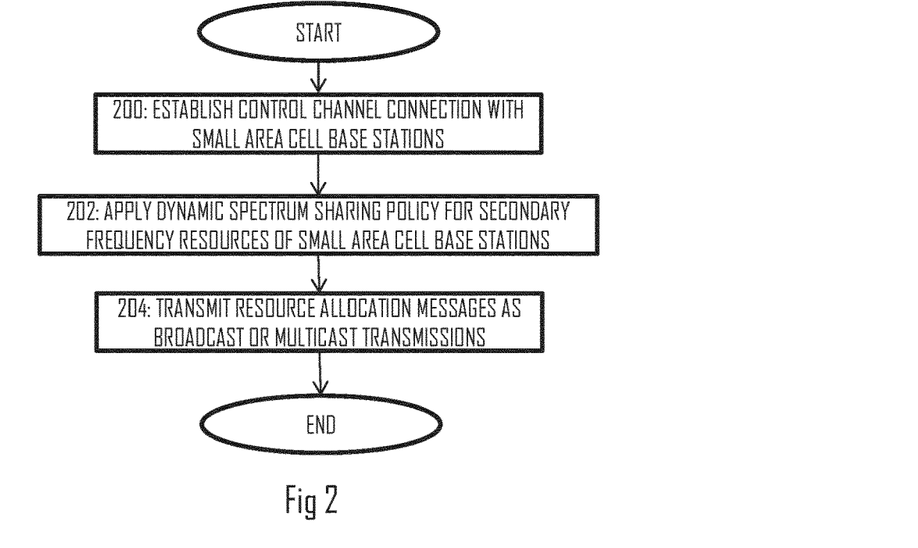
FIGS. 2 and 3 illustrate flow diagrams of embodiments for carrying out dynamic resource allocation of secondary frequency resources.

FIG. 2 illustrates a flow diagram describing a process for allocating frequency resources by the large area cell base station 116 to the small area cell base stations 100, 102, 110, 112, 120. Referring to FIG. 2, the process comprises establishing a control connection with a plurality of small area cell base stations comprised in a coverage area of the large area cell base station (block 200). In block 202, the large area cell base station applies a dynamic spectrum sharing policy for the plurality of small area cell base stations to allocate time-frequency resources to the plurality of small area cell base stations from a frequency band shared by the plurality of small area cell base stations for use as a secondary frequency resource supplementing a main operating frequency band of the plurality of small area cell base stations. In block 204, the large area cell base station transmits as broadcast or multicast transmissions time-frequency resource allocation messages indicating allocated time-frequency resources to the small area cell base stations.

In an embodiment, the large area cell base station may transmit at least some of the time-frequency resource allocation messages as unicast messages addressed to an individual small area cell base station. For example, time-frequency resource allocation messages allocating a time-frequency resource initially may be transmitted as the multicast or broadcast transmissions, while any changes to the initial allocation may be transmitted as the unicast messages. The change may be cancellation of the allocation or change of the allocated time-frequency resources from one time-frequency resource to another time-frequency resource.

Figure 3:
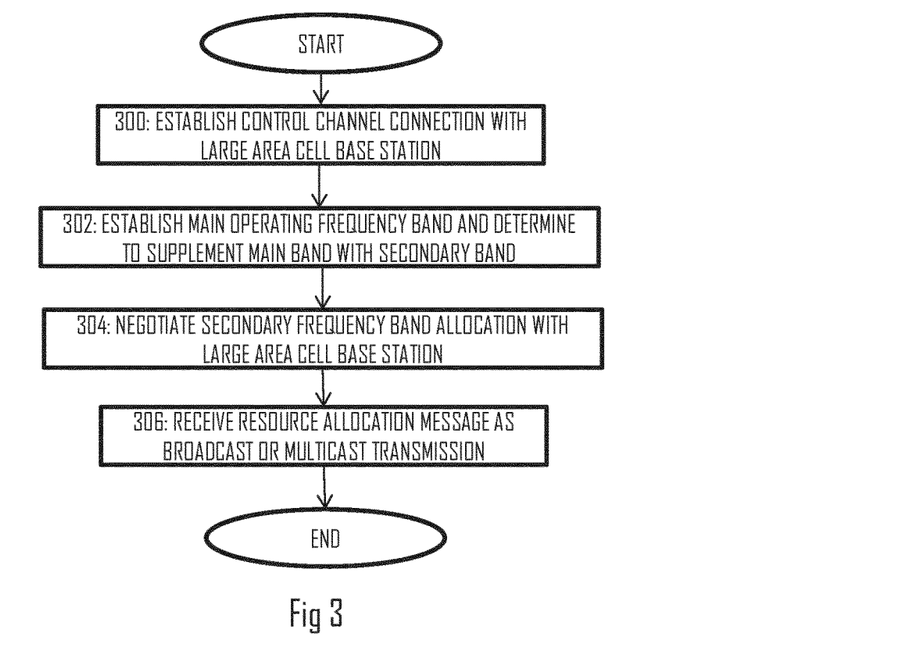

FIG. 3 illustrates a corresponding process executed in a small area cell base station, e.g. one of the base stations 100, 102, 110, 112, 120. Referring to FIG. 3, the process comprises establishing the control connection with a large area cell base station detected by the small area cell base station (block 300). In block 302, the small area cell base station establishes a main operating frequency band on a first frequency band.

In block 302, the small area cell base station further determines to supplement the main operating frequency band with at least one secondary frequency resource on a second frequency band shared with at least one other small area cell base station. Block 302 may comprise determining to employ a secondary component carrier. In response to said determining in block 302, the small area cell base station may negotiate with the large area cell base station about allocation of the secondary frequency resource to the small area cell base station in block 304. The negotiation comprises receiving in block 306 as a broadcast or multicast transmission a time-frequency resource allocation message indicating a time-frequency resource allocated to the small area cell base station from the secondary frequency resource.

Dynamic sharing of the secondary frequency resources enables efficient spectrum utilization and fast response to the changing traffic demands in the small area cell base stations.

In an embodiment, a determined large area cell base station is selected to control the co-primary sharing of the secondary frequency resources in an area comprising a plurality of large area cell base stations. The controlling large area cell base station may be preconfigured by network operators in cooperation, for example, or the large area cell base stations of the different operators may negotiate with each other about the responsibility. The determined large area cell base station may broadcast an information element indicating to the small area cell base stations that it is controlling the co-primary sharing of the secondary frequency resources. The other large area cell base stations located in the same area, on the other hand, may broadcast an information element indicating to the small area cell base stations that the determined large area cell base station is controlling the co-primary sharing of the secondary frequency resources. Accordingly, a small area cell base station receiving any one of these broadcasts is able to determine the large area cell base station to which to establish the control connection for the purpose of co-primary shared use of the secondary frequency resources.

In an embodiment, the time-frequency resource allocation messages may be transmitted as radio resource control (RRC) signaling messages on layer 3 of a protocol stack. This means rapid adaptation and signaling mechanism in connection with the dynamic resource allocation. In an embodiment, a large area cell base station may transmit a time-frequency resource allocation message on a broadcast control channel in a system broadcast information block. In an embodiment, a small area cell base station may transmit a time-frequency resource allocation message, e.g. a resource allocation request, to the controlling large area cell base station on a random access channel (RACH) provided by the large area cell base station. In an LTE system, the time-frequency resource allocation message may be transmitted by the small area cell base station as a RACH msg 3 message (RRC Connection Request). In an embodiment, at least one time-frequency resource allocation message may be transmitted on a physical layer or a link layer. Such a message may indicate rapid termination of the resource allocation, e.g. when there is no longer has need for the resource allocation but there are still unused resourced in the allocation. The link layer or physical layer rapid termination message may be transmitted by the small area cell base station or the large area cell base station. In an embodiment, the small area cell base station may transmit the resource allocation request as a link layer (Layer 2) or a physical layer (Layer 1) message, or as a combination of the link layer and the physical layer message. The layer 1 message may provide for a fast indication of the resource allocation request while the link layer or RRC layer message may provide the details of the resource reservation request, e.g. specify the resources requested for allocation. Similarly for the other types of time-frequency resource allocation messages, e.g. messages releasing or modifying the allocated time-frequency resource, the messages may be transmitted by the large area cell base station and/or the small area cell base station on any one of the above-described layers 1, 2, or 3.

In an embodiment, the small area cell base station may be in an RRC connected state or in RRC idle state with respect to the controlling wide area cell base station when exchanging the resource allocation messages. In an embodiment, the small area cell base station may be configured to employ discontinuous reception (DRX) towards the serving large area cell base station, e.g. the DRX of the LTE specification. In the DRX mode, the small area cell base station may monitor a control channel of the large area cell base station discontinuously. In an embodiment, the small area cell base station may employ at least one terminal device served by the small area cell base station to monitor the control channel of the large area cell base station for the duration of the DRX mode. The small area cell base station may select and configure one or more terminal devices to monitor for the control channel and report to the small area cell base station any control messages transmitted by the large area cell base station to an address associated with the small area cell base station. Such control messages may comprise the resource allocation messages, for example. Accordingly, the small area cell base station will not miss any control messages even during the DRX mode. Additionally, the terminal device(s) may be employed in carrying out neighbor measurements and reporting on behalf of the small area cell base station in the DRX mode. The terminal device(s) may measure the presence of the neighboring base stations and report them either directly to the large area cell base station or through the small area cell base station.

In an embodiment, the large area cell base station controlling the small area cell base stations located within its coverage area may provide the small area cell base stations with synchronization reference. The synchronization reference may enable the small area cell base stations to synchronize to the frame timing of the large area cell base station, thus reducing interference between the cells.

In an embodiment, the time-frequency resource allocation messages transmitted by the controlling large area cell base station in broadcast or multicast messages may be addressed to a broadcast address or to a multicast address addressing the small area cell base stations controlled by the wide area cell base stations. This enables the small area cell base stations to detect not only their own resource allocations but also resource allocations of other small area cell base stations controlled by the same wide area cell base station. The address common to the small area cell base stations may be a cellular radio temporary identifier (C-RNTI) allocated commonly to the small area cell base stations. The resource allocations of different small area cell base stations may be identified by another identifier in the time-frequency resource allocation messages, the other identifier being unique amongst the small area cell base stations. The other identifier may be a global cell identifier (GCI) or a physical layer cell identifier.

Figure 4:
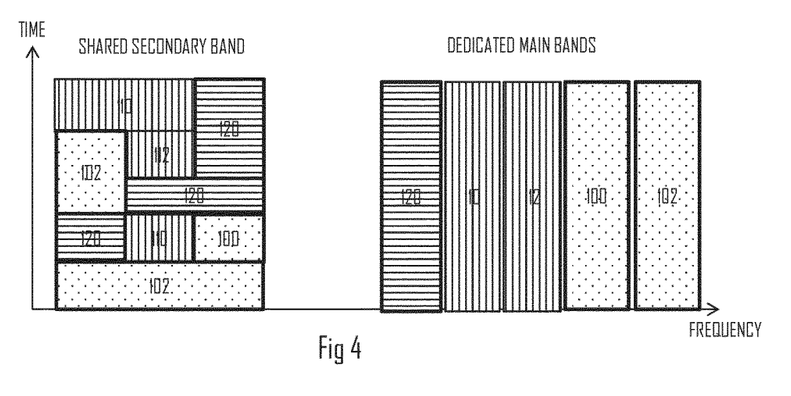
FIG. 4 illustrates a time-frequency diagram of resource allocation on a main frequency band and on a secondary frequency band.

Let us now describe the frequency allocation of the small area cell base stations 100, 102, 110, 112, 120 with reference to FIG. 4. FIG. 4 illustrates the frequency allocations of the base stations 100, 102, 110, 112, 120 by denoting their reference numbers and associated filling indicating the operator. The main operating band (right hand side of FIG. 4) may be a static or at least a semi-static allocation such that the small area cell base station may operate normally regardless of whether or not it has allocated secondary frequency resources. The signalling between the small area cell base stations and the large area cell base station may be carried out on a main frequency band or a secondary frequency band of the large area cell base station. This frequency band may be different from the main operating bands of the small area cell base stations controlled by the large area cell base station. The frequency bands of the large area cell base station may further be used for communication between the large area cell base station and terminal devices served by the large area cell base station. For example, the time-frequency resource allocation messages may be transferred on the main operating band of the large area cell base station. The frequency bands illustrated in FIG. 4 may be used for the communication between the small area cell base stations and the terminal devices served by the small area cell base stations.

The small area cell base station may employ its primary component carrier on the main operating band and, additionally one or more secondary carriers according to the traffic needs of the small area cell base station. Such carrier aggregation is in use in LTE systems, for example. The secondary carriers may be employed on contiguous or non-contiguous bands with respect to the primary component carrier.

As shown on the left hand side of FIG. 4, the secondary frequency resources of the base stations 100, 102, 110, 112, 120 are allocated dynamically from a shared secondary band. It may be understood such that a certain frequency resource may at one time instant be allocated to one base station and on a second time instant to another base station. A single frequency resource may be allocated to a base station for a time interval of some milliseconds, e.g. ten milliseconds or less than a second. As shown in FIG. 4, time-frequency resources of different sizes may be allocated from the shared secondary band to the small area cell base stations. The time-frequency resources may be segmented into a plurality of different time-frequency chunks, and each chunk may be associated with an index. The index may be mapped to a frequency band and duration of the chunk. The frequency band may be defined in terms of a centre frequency and bandwidth or using a specification of the cellular communication system. For example, in an LTE system frequency band is divided into a plurality of resource blocks each having a fixed bandwidth, and variable bandwidths may be realized by combining the resource blocks. Different chunks may have different combinations of the duration and frequency band, thus realizing chunks with varying bandwidths, centre frequencies, and durations. This facilitates efficient utilization of the secondary band. The indexing may be used to identify a chunk when the small area cell base stations requests for a resource allocation and/or when the large area cell base station signals the resource allocation.

Figure 5:
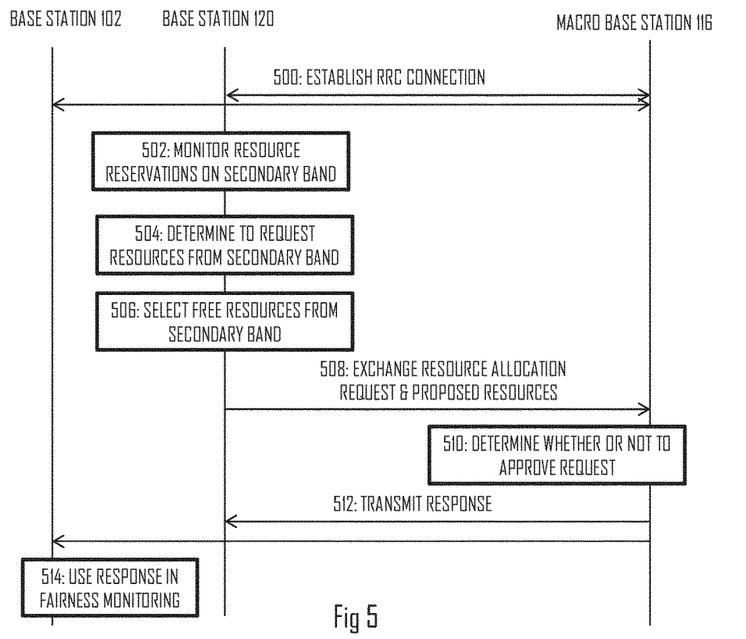
FIGS. 5 to 7 illustrate signalling diagrams of embodiments for realizing the dynamic resource allocation between small area cell base stations and a large area cell base station.
Figure 6:
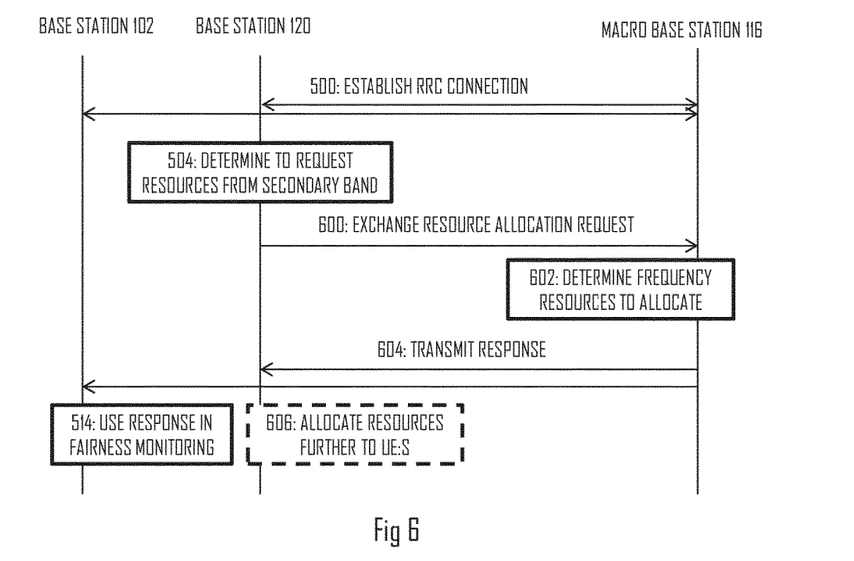
Figure 7:
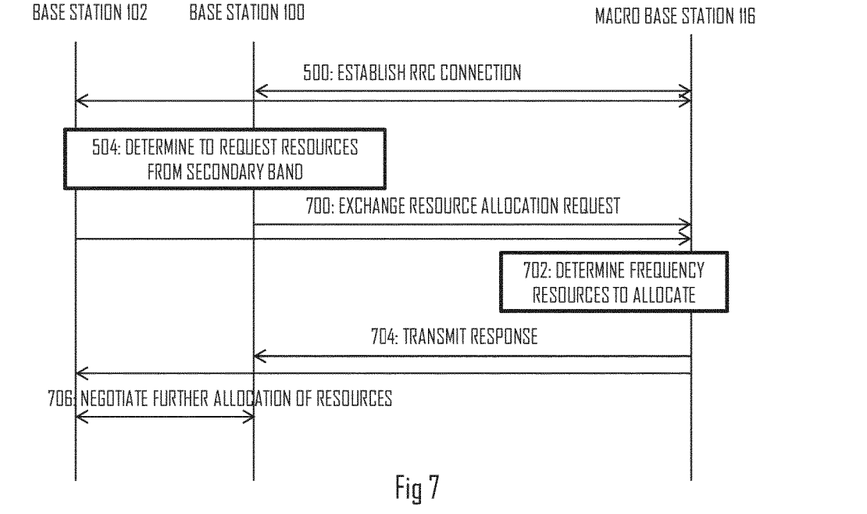

Let us now describe some embodiments of FIGS. 2 and 3 with reference to signalling diagrams of FIGS. 5 to 7. FIGS. 5 to 7 illustrate embodiments for carrying out the resource allocation for the secondary frequency resource, e.g. the shared secondary band of FIG. 4. FIGS. 5 to 7 illustrate signalling between a large area cell base station, e.g. the macro cell base station 116, and small area cell base stations controlled by the large area cell base station.

Let us now describe some embodiments for allocation a frequency resource to a small area cell base station 120. Referring to FIG. 5, the small area cell base stations 102, 120 and the macro cell base station 116 establish the control connection in step 500. The control connection may comprise a RRC connection. In block 502, the base station 120 monitors for the resource reservation status of the secondary frequency resource. This may be enabled by the transmission of the time-frequency resource allocation messages as broadcast or multicast transmissions, as described above. Accordingly, the small area cell base station 120 may determine in block 502 the resource reservation status by monitoring the time-frequency resource allocation messages received from the macro cell base station 116. In block 504, the base station 120 determines that it needs additional communication resources from the secondary frequency resource. In block 506, the base station 120 checks the current resource reservations and selects a time-frequency resource (a chunk) from the next available time-frequency resources that matches the current traffic demand of the base station 120. The base station 120 may determine the frequency band (e.g. frequency location and bandwidth) and the duration of the determined chunk and select an index mapped to the chunk. Then, the base station 120 may create a resource allocation request indicating the selected time-frequency resource, e.g. the index, and transmit the resource allocation request to the macro cell base station 116 in step 508.

In an embodiment, the large area cell base station may provide a contention window defined by the duration of one or more frames or sub-frames of the large area cell base station. The small area cell base stations may transmit the resource allocation requests only within the contention window. The small area cell base stations may be configured to use the same contention window. Let us assume that the small area cell base stations are synchronized to the large area cell base station and given, by the large area cell base station, a 10 ms (milliseconds) contention window followed by a 200 ms spectrum-sharing interval. In this example, during the 10 ms contention window, the large area cell base station may monitor for resource allocation requests from the small area cell base stations. The requests of small area cell base stations may transmit the resource allocation requests in a contention-based manner or a non-contention based manner. The contention-based transmission may be carried out by using a RACH msg 3 without dedicated preambles assigned for sending the physical RACH. The non-contention-base scheme may be carried out by using dedicated signaling or by using the RACH msg3 with a dedicated preamble assigned each small area cell base station for sending the physical RACH. The large area cell base station may make decisions based on all the received requests and allocate chunks of resources to the requesting small area cell base stations during the spectrum sharing interval. The transmission of the resource allocation messages from the large area cell base station to the small area cell base stations may also be carried out during the spectrum sharing interval The contention may thus be carried out by contending to transmit the resource allocation request (in the case of contention-based transmission scheme) or based on the contents of requests (in the case of non-contention-base scheme). In the latter scheme, the contention may be based on two or more small area cell base stations requesting for the same resources. There are several advantages with the use of such a contention window. The sharing may be synchronized. The large area cell base station does not have to control the sharing all the time but only during the contention window from time to time as predefined and configured. The small area cell base station may gain access to the entire co-primary sharing spectrum if it is the only one contending for the resources during the present contention window.

Upon receiving the resource allocation request in step 508, the macro cell base station may extract the indicated time-frequency resource from the request and check the current reservation status of the indicated time-frequency resource. If there is a prior reservation to at least a part of the time-frequency resource, the macro cell base station 116 may determine that the request cannot be accepted. Another small area cell base station may have made a prior request on at least partially the same time-frequency resource during the execution of blocks 504 and 506, for example. On the other hand, if there are no prior reservations of the time-frequency resource, the macro cell base station 116 may determine that the request can be accepted. The resource reservation may thus be carried out as reservation contention, and the macro cell base station 116 may provide the contending small area cell base stations with contention resolution in block 510. In step 512, the macro cell base station 116 transmits a response to the resource allocation request as the broadcast or multicast transmission. The response may comprise an approval or a rejection of the request. In an embodiment where the macro cell base station 116 determines that the request cannot be approved and determines a new time-frequency resource that can be allocated to the base station 120 in block 510, the response transmitted in step 512 may comprise a rejection and the proposal as a substitute resource allocation. The proposal may comprise an index of a chunk corresponding to the determined new time-frequency resource.

Upon receiving the response in step 512, the base station may determine a course of action as response to the contents of the response. If the response is approval, the base station may use the allocated time-frequency resource in transmission and/or reception with one or more terminal devices served by the base station 120. Accordingly, the base station 120 may further allocated time-frequency resources to the one or more terminal devices from the allocated time-frequency resource. If the response is rejection, the base station 120 may return to block 506. If the response is the proposal of a substitute time-frequency resource, the base station 120 may determine whether or not the proposal is acceptable and transmit a corresponding response to the macro cell base station 116. If the proposal is acceptable, the base station 120 may transmit an acknowledgment message to the macro cell base station and use the allocated time-frequency resource in transmission and/or reception with one or more terminal devices served by the base station 120. If the proposal is not acceptable, the base station 120 may transmit a rejection to the macro cell base station and return to block 506.

In an embodiment, the macro cell base station may consider spatial reuse of a determined time-frequency resource for the co-primary sharing. In an embodiment, the small area cell base stations may report detected neighboring small area cell base stations and/or location information of themselves. Such information may be reported periodically and/or in the resource allocation request. The macro cell base station may then determine whether or not two small area cell base stations potentially interfere with one another. If the macro cell base station determines that interference is possible, it may ensure that the same time-frequency resources are not allocated to the two small area cell base stations. On the other hand, if the macro cell base station determines that interference is not probable, it may allocate the same or overlapping time-frequency resources to the two small area cell base stations. The two small area cell base stations may belong to the same operator or to different operators.

Said determining whether or not the proposed substitute time-frequency resource is acceptable may comprise determining whether or not the use of the substitute time-frequency resource would increase interference towards another cell. For example, a small area cell base station 100 located in a coverage area of two macro cell base stations 116, 124 may monitor the resource reservations of secondary frequency resources controlled by each macro cell base station 116, 124. Thus, the small area cell base station 100 may select and propose secondary frequency resources that are not occupied in either macro cell, thus reducing interference in the system. This is particularly advantageous when the macro cell base stations 116, 124 belong to different operators and, thus, do not communicate directly with one another.

As described above, the other small area cell base stations controlled by the macro cell base station 116 area, e.g. the base station 102, also able to receive the time-frequency resource allocation message in step 512. The time-frequency resource allocation message may be used by the base station 102 to evaluate fairness in the resource allocations carried out by the macro cell base station. In a situation where a large area cell base station of on operator controls small area cell base stations of multiple operators, the fairness monitoring may be used to ensure that the large area cell base station does not prefer small area cell base stations belonging to the same operator as the operator of the large area cell base station. Block 514 may comprise monitoring the proportions of the resource allocations, the number of rejected resource allocation requests, or any other metric indicative of the fairness of the resource allocations. Any detected unfairness may be reported by the base station 102 to an operator-independent entity managing spectrum sharing policies.

In an embodiment where the large area cell base station transmits the time-frequency resource allocation messages as the unicast transmissions, the fairness may be monitored by the large area cell base station. In another embodiment using the unicast transmissions, the large area cell base station may provide each small area cell base station with a status report on current sharing status of the secondary frequency resources. The status report may be provided as the broadcast, multicast, or unicast signalling. Accordingly, the small area cell base stations may monitor the fairness although they do not receive the actual time-frequency resource allocation messages of the other small area cell base stations.

FIG. 6 illustrates another embodiment for carrying out the resource allocation. In this embodiment, the large area cell base station selects the resources to allocate upon receiving a scheduling request from a small area cell base station. Referring to FIG. 6, step 502 may be omitted in this embodiment, or the base station(s) 102, 120 may carry out block 502 for monitoring the fairness of the resource allocations. Upon determining the need for additional frequency resources in block 504, the base station 120 may transmit a resource allocation request to the macro cell base station 116 in step 600. The resource allocation request according to this embodiment is a generic request for resource scheduling without specifying a determined resource from the secondary frequency resource. In an embodiment, the small area cell base stations transmit load reports to the macro cell base station, a load report indicating a current traffic load of a small area cell base station. Other reports indicating the traffic demand may equally be used. Other types of reports may also be created by the small area cell base stations and employed in the resource allocation by the macro cell base station 116. Such a report may comprise a neighbour list comprising small area cell base stations controlled by another macro cell base station and using the co-primary sharing of the secondary frequency resources. The macro cell base station 116 may employ the neighbour list in avoiding allocation of frequency resources that increase interference towards the base stations comprised in the neighbour list. The neighbour list may comprise identifiers of the neighbouring base stations and information on their frequency allocations. The neighbour list may comprise an identifier of one or more large area cell base stations and one or more small area cell base stations employing the co-primary sharing of the secondary frequency resources and detected by a small area cell base station.

Upon receiving the resource allocation request in step 600, the macro cell base station 116 selects a time-frequency resource (a chunk) to schedule to the base station 120. Upon selecting the chunk, the macro cell base station 116 may determine an index of the chunk, create a response to the resource allocation request comprising the index, and transmit the response to the base station in step 604. The response may thus explicitly indicate the allocated time-frequency resource. Upon receiving the response in step 604, the base station 120 may determine the allocated time-frequency resource and use it in communication with the one or more terminal devices served by the base station 120. This may comprise scheduling the time-frequency resource further to the one or more terminal devices in block 606. As described above, the other small area cell base stations may use the response received in step 604 in fairness monitoring (block 514).

In an embodiment, the macro cell base station may allocate a time-frequency resource commonly to a plurality of small area cell base stations, and the small area cell base stations may internally determine the utilization of the common temporary time-frequency resource. FIG. 7 illustrates such an embodiment. FIG. 7 illustrates the procedure by using the embodiment of FIG. 6 where the small area cell base stations do not specify the time-frequency resource, but the principle is equally applicable to the embodiment of FIG. 5 where the small area cell base stations select a time-frequency resource and request for its allocations. Referring to FIG. 7, the small area cell base stations 100, 102 both determine to request the additional time-frequency resources from the macro cell base station in block 504 and transmit an associated resource allocation request in block 700. In an embodiment, only one of the base stations 100, 102 belonging to the same operator may transmit the resource allocation request on behalf of multiple base stations. The base stations 100, 102 may have exchanged information about requesting the allocation of the secondary frequency resources and negotiate about the base station that will carry out the request. This will reduce signalling overhead in the signalling between the base stations 100, 102 and the large area cell base station 116. Upon receiving the requests in step 700, the macro cell base station 116 may select time-frequency resources to allocate commonly to the base stations 100, 102 (block 702). The size of the time-frequency resources may be determined on the basis of the traffic demands of the base stations 100, 102. Upon selecting the time-frequency resources and determining associated one or more indexes, the macro cell base station may transmit in step 704 a response indicating the time-frequency resources allocated to the base station. The response may comprise a flag or another indicator indicating that the same time-frequency resources are allocated to the base stations 100, 102. In general, the indicator may be used to indicate that the time-frequency resources are allocated to a plurality of small area cell base stations. In an embodiment, the indicator identifies the small area cell base stations to which the time-frequency resources are allocated. Upon receiving the response and determining the allocation and that the time-frequency resource is commonly owned, the base stations may negotiate in step 706 about the further allocation of the time-frequency resources between the base stations. Block 706 may comprise control signalling about how the time-frequency is divided between the base stations 100, 102 for the whole duration of the allocation. Block 706 may comprise control signalling of channel contention to acquire reservation basis without any fixed or preliminary channel allocation. The allocation principles in block 706 may thus be realized in a various manners.

In an embodiment, the time-frequency resource is allocated commonly only to a plurality of small area cell base stations of the same operator. A reason may be that the signalling between the small area cell base stations needed in block 706 may only be realized between base stations of the same operator.

Figure 8:
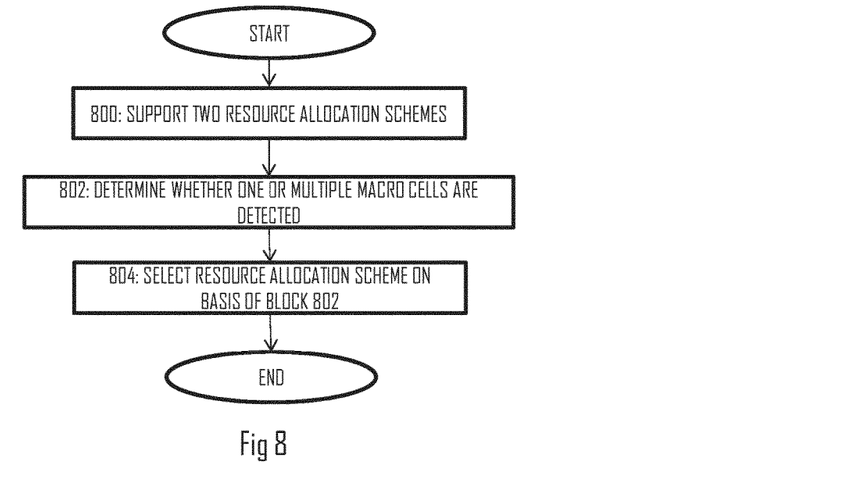
FIG. 8 illustrates a flow diagram of a process for selecting a resource allocation scheme for a small area cell base station.

FIG. 8 illustrates an embodiment where the small area cell base station supports multiple resource allocation schemes and selects a resource allocation scheme for use according to a determined criterion. Referring to FIG. 8, the small area cell base station supports the schemes of FIGS. 5 and 6 (block 800). In particular, the small area cell base station may support the scheme where the small area cell base station selects the time-frequency resource from the secondary frequency resources and requests for the allocation of the specified resource. The small area cell base station may also support the scheme where the small area cell base station requests the resource allocation from the secondary frequency resource without specifying any specific time-frequency resource, and the wide area cell base station makes the time-frequency resource selection. In block 802, the small area cell base station determines the number of wide area cell base stations it currently detects. A detection threshold may be defined as a threshold of whether or not the small area cell base station could be controlled by the wide area cell base station, and the detection threshold may be determined in terms of signal strength of a signal received from the wide area cell base station. If the received signal strength is higher than the detection threshold, the small area cell base station may determine that the large area cell base station is detected. In block 804, the small area cell base station selects the resource allocation scheme amongst the supported resource allocation schemes on the basis of the number of detected wide area cell base stations.

As an example, let us consider the small area cell base station 112 detecting only the wide area cell base station 116. The small area cell base station 112 may determine that it detects only a single wide area cell base station and, as a consequence, may select the resource allocation scheme where the small area cell base station 112 requests the resource allocation from the secondary frequency resource without specifying any specific time-frequency resource. The small area cell base station 112 is not located in a service area of another wide area cell base station so the resource allocations do not cause interference towards any other wide area cell base stations.

Then, let us consider the small area cell base station 100 detecting more than one wide area cell base station 116, 124. The small area cell base station may determine that it detects multiple wide area cell base stations and, thus, select the resource allocation scheme where the small area cell base station selects the time-frequency resource from the secondary frequency resources and requests for the allocation of the specified resource. In another embodiment, small area cell base station may determine that it detects multiple wide area cell base stations of different operators and, thus, select the resource allocation scheme where the small area cell base station selects the time-frequency resource from the secondary frequency resources and requests for the allocation of the specified resource. Since the small area cell base station 100 resides in the service area of multiple wide area cell base stations (of different operators), the small area cell base station may be configured to ensure that the resource allocations do not cause interference towards other wide area cell base stations. The small area cell base station 100 may thus select the secondary frequency resources that are not occupied in either wide area cell. In the embodiments where the wide area cell base station proposes the substitute frequency resources as a result of rejecting the allocation of the resources proposed by the small area cell base station, the small area cell base station may be configured to check the substitute resources against the resources allocated in the other wide area cell. If the small area cell base station detects an overlapping reservation, it may reject the substitute resources and transmit a rejection to the wide area cell base station. Otherwise, it may approve the substitute resources. As a consequence, the small area cell base station 100 at an edge of a large area cell of the large area cell base station 116 may contribute to the reduced interference in neighbouring large area cells.

Similarly, the large area cell base station may support both or multiple resource allocation schemes and select an appropriate scheme on the basis of the type of request received from a small area cell base station. If the small area cell base station specifies a resource requested for allocation, the large area cell base station may employ one scheme only requesting or denying the request (or proposing substitute resources). If the small area cell base station does not specify a resource, the large area cell base station may select the secondary frequency resources and signal them to the small area cell base station.

In an embodiment, the small area cell base station 100, 102, 110, 112, 120 is configured to broadcast information on the participation in the co-primary sharing of the secondary frequency resources according to any one of the embodiments described above. Neighbouring base stations, e.g. those belonging to a co-primary sharing group of a neighbouring large area cell base station, may thus become aware of the dynamic allocation of the secondary frequency resources. The broadcasted information may comprise at least one information element indicating at least one of the following: capability of the small area cell base station to the co-primary sharing of the secondary frequency resources, need of the small area cell base station to take into use the co-primary sharing of the secondary frequency resources, current presence in the co-primary sharing of the secondary frequency resources. Any one of these may be indicated with a one-bit indicator, for example.

Figure 9:
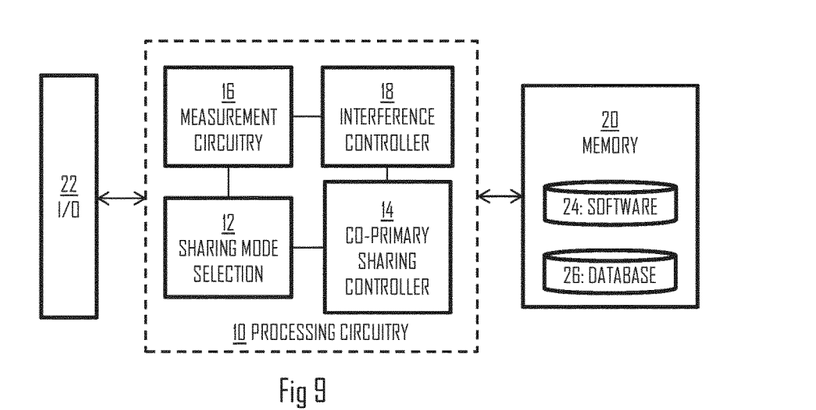
FIGS. 9 and 10 illustrate block diagrams of structures of apparatuses according to some embodiments of the invention.

An embodiment provides an apparatus comprising at least one processor and at least one memory including a computer program code, wherein the at least one memory and the computer program code are configured, with the at least one processor, to cause the apparatus to carry out the procedures of the above-described small area cell base station, e.g. in the process of FIG. 3. FIG. 9 illustrates a block diagram of a structure of such an apparatus. The apparatus may be comprised in the small area cell base station or, in some embodiments, the apparatus is the small area cell base station. The apparatus comprises a processing circuitry 10 comprising the at least one processor. The processing circuitry 10 may comprise a co-primary sharing controller 14 configured to manage the use of the secondary frequency resources that supplement the main operating frequency band of the small area cell base station. The co-primary sharing controller 14 may determine the need for the additional frequency resources and, upon determining to use them, carry out signalling with the serving large area cell base station according to any one of the above-described embodiments.

An operating mode of the co-primary sharing controller may be configured by a sharing mode selection circuitry 12. In other words, the sharing mode selection circuitry may select the above-described resource allocation scheme for the co-primary sharing of the secondary frequency resources. The sharing mode selection circuitry 12 may be configured to determine a type of a resource allocation scheme on the basis of measurements carried out by a measurement circuitry 16. If the measurement circuitry indicates that only the serving large area cell base station has been detected, the sharing mode selection circuitry may select a scheme where the selection of the resources is carried out by the large area cell base station. Otherwise, the sharing mode selection circuitry 14 may configure the co-primary sharing controller 14 to select the resources and signal the selected resources to the large area cell base station in the resource allocation request. When using the latter scheme, the co-primary sharing controller may negotiate with an interference controller 18 configured to receive measurement results from the measurement circuitry 16 and monitor for the occupation of the secondary frequency resources in neighboring cells. Accordingly, the co-primary sharing controller 14 is able to select resources that reduce interference towards the neighboring cells. A database 26 stored in the memory 20 may store the measurement results, a neighbor cell list, etc.

The processing circuitry 10 may comprise the circuitries 12 to 18 as subcircuitries, or they may be considered as computer program modules executed by the same physical processing circuitry. The memory 20 may store one or more computer program products 24 comprising program instructions that specify the operation of the circuitries 12 to 18. The apparatus may further comprise an input/output (I/O) interface 22 providing the apparatus with communication capability over one or more communication networks, e.g. with the large area cell base station(s) of the cellular communication system and/or other small area cell base stations. The I/O interface 22 may comprise a radio communication circuitry enabling wireless communications and a wired communication circuitry enabling wired communications.

Figure 10:
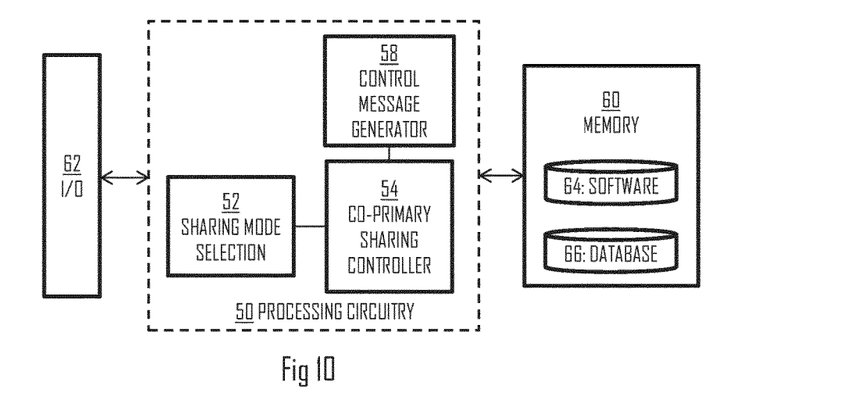

An embodiment provides another apparatus comprising at least one processor and at least one memory including a computer program code, wherein the at least one memory and the computer program code are configured, with the at least one processor, to cause the apparatus to carry out the procedures of the above-described large area cell base station, e.g. in the process of FIG. 2. FIG. 10 illustrates a block diagram of a structure of such an apparatus. The apparatus may be comprised in the large area cell base station or, in some embodiments, the apparatus is the large area cell base station. The apparatus comprises a processing circuitry 50 comprising the at least one processor. The processing circuitry 50 may comprise a co-primary sharing controller 54 configured to manage the use of the secondary frequency resources that supplement the main operating frequency band of small area cell base stations controlled by the large area cell base station. The co-primary sharing controller 54 may process resource allocation requests received from the small area cell base stations and carry out the contention resolution according to any one of the above-described embodiments. The co-primary sharing controller 54 may then output the result of the contention resolution to a control message generator 58 configured to generate the multicast or broadcast messages comprising the results and transmit the messages as the multicast or broadcast transmissions.

An operating mode of the co-primary sharing controller may be configured by a sharing mode selection circuitry 52. In other words, the sharing mode selection circuitry 52 may select the above-described resource allocation scheme for the co-primary sharing of the secondary frequency resources. The sharing mode selection circuitry 52 may be configured to determine a type of a resource allocation scheme on the basis of a type of a resource allocation request received from a small area cell base station. As described above, if the request specifies a specific resource, the co-primary sharing controller 54 may be configured to determine the availability of the requested resource for the allocation. If the request does not specify a resource, the co-primary sharing controller 54 may select a free resource and cause the control message generator to indicate the selected resource in the broadcasted or multicasted resource allocation message.

The processing circuitry 50 may comprise the circuitries 52 to 58 as subcircuitries, or they may be considered as computer program modules executed by the same physical processing circuitry. The memory 60 may store one or more computer program products 64 comprising program instructions that specify the operation of the circuitries 62 to 68. The apparatus may further comprise an input/output (I/O) interface 62 providing the apparatus with communication capability over one or more communication networks, e.g. with other large area cell base station(s) of the cellular communication system and/or with small area cell base stations. The I/O interface 62 may comprise a radio communication circuitry enabling wireless communications and a wired communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an applicationspecific integrated circuit (ASIC), and/or a field-programmable grid array (FPGA) circuit for the apparatus according to an embodiment of the invention.

The processes or methods described in connection with FIGS. 2 to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular communication systems defined above but also to other suitable communication systems. The protocols used, the specifications of communication systems and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   establishing, by a large area cell base station of a cellular communication system, a control connection with a plurality of small area cell base stations in a coverage area of the large area cell base station, at least a first small area cell base station and a second small area cell base station of the plurality of small area cell base stations belonging to different network operators;
   allocating, by the large area cell base station based on a dynamic spectrum sharing policy associated with co-primary spectrum for the plurality of small area cell base stations, time-frequency resources to one or more of the plurality of small area cell base stations from a frequency band of the co-primary spectrum shared by the plurality of small area cell base stations, the co-primary spectrum being jointly used by the different network operators; and
   transmitting, by the large area cell base station, one or more time-frequency resource allocation messages indicating the allocated time-frequency resources from the frequency band shared by the plurality of small area cell base stations.

2. The method of claim 1, wherein at least some of the one or more time-frequency resource allocation messages are transmitted on a radio resource control protocol layer of a protocol stack of the large area cell base station.

3. The method of claim 1, wherein at least some of the one or more time-frequency resource allocation messages are addressed to a cellular network identifier common to the plurality of small area cell base stations.

4. The method of claim 3, wherein at least some of the one or more time-frequency resource allocation messages further comprise another cellular network identifier that specifies a small area cell base station to which a time-frequency resource has been allocated.

5. The method of claim 1, wherein at least some of the one or more time-frequency resource allocation messages are transmitted as multicast or broadcast messages.

6. The method of claim 1, wherein the frequency band shared by the plurality of small area cell base stations is for use as a secondary frequency resource supplementing a main operating frequency band of the plurality of small area cell base stations.

7. The method of claim 1, further comprising:
   allocating, by the large area cell base station, a determined time-frequency resource to a group of small area cell base stations; and
   transmitting, by the large area cell base station a time-frequency resource allocation message indicating that the determined time-frequency resource is allocated to the group of small area cell base stations.

8. The method of claim 1, further comprising in the large area cell base station:
   receiving, from a small area cell base station, a resource allocation request;
   in response to the received request, determining a time-frequency resource to allocate to the small area cell base station; and
   transmitting, by the large area cell base station a resource allocation response indicating the allocation to the plurality of small area cell base stations.

9. The method of claim 8, wherein the resource allocation request specifies the time-frequency resource the small area cell base station requests for allocation, and wherein the resource allocation response comprises an information element selected from a group comprising at least the following: an acknowledgment of the resource allocation request, a rejection of the resource allocation, and a proposal of a time-frequency resource different from the time-frequency resource specified in the resource allocation request.

10. The method of claim 8, wherein the resource allocation request is a scheduling request without specifying any specific time-frequency resource.

11. A method comprising:
    establishing, by a small area cell base station of a cellular communication system, a control connection with a large area cell base station detected by the small area cell base station to control dynamic spectrum sharing policy associated with co-primary spectrum for a plurality of small area cell base stations from a frequency band of the co-primary spectrum shared by the plurality of small area cell base stations, at least a first small area cell base station and a second small area cell base station of the plurality of small area cell base stations belonging to different network operators, and the co-primary spectrum being jointly used by the different network operators;
    determining a need for frequency resources from the frequency band shared by the plurality of small area cell base stations;
    in response to said determining, negotiating by the small area cell base station with the large area cell base station about allocation of the frequency resources to the small area cell base station from the frequency band of the co-primary spectrum shared by the plurality of small area cell base stations, wherein said negotiation comprises receiving, by the small area cell base station from the large area cell base station a time-frequency resource allocation message indicating a time-frequency resource allocated by the large area cell base station to the small area cell base station from the frequency band shared by the plurality of small area cell base stations.

12. The method of claim 11, wherein said negotiation comprises the small area cell base station performing one of the following:
    1) transmitting a resource allocation request to the large area cell base station, the resource allocation request specifying a time-frequency resource the small area cell base station requests for allocation; and
    receiving, from the large area cell base station a resource allocation response indicating whether or not the requested time-frequency resource has been allocated to the small area cell base station; and 2) transmitting a resource allocation request to the large area cell base station without specifying any time-frequency resource; and receiving, from the large area cell base station a resource allocation response indicating a time-frequency resource allocated to the small area cell base station.

13. The method of claim 11, wherein the small area cell base station supports both of the following time-frequency resource allocation schemes:
   (a) the small area cell base station determines a time-frequency resource to request for allocation, transmits a resource allocation request to the large area cell base station and specifies the determined time-frequency resource in the resource allocation request, and receives as a resource allocation response an acknowledgment or rejection of the request;
   (b) the small area cell base station transmits a resource allocation request to the large area cell base station without specifying any time-frequency resource, the large area cell base station selects and allocates the time-frequency resource to the small area cell base station;
   the method further comprising in the small area cell base station:
   selecting the time-frequency resource allocation scheme (a) when the small area base station determines to be in a service area of a plurality of large area cell base stations; and
   selecting the time-frequency resource allocation scheme (b) when the small area cell base station determines to be in a service area of only one large area cell base station.

14. The method of claim 11, wherein the time-frequency resource allocation request is transmitted on a random access channel of the large area cell base station.

15. The method of claim 11, further comprising establishing, by the small area cell base station, a main operating frequency band on a first frequency band and using the frequency band shared by the plurality of small area cell base stations as a secondary frequency resource supplementing the main operating frequency band.

16. The method of claim 11, wherein the small area cell base station communicates with the large area cell base station on an operating frequency band of the large area cell base station different from a main operating frequency band of the small area cell base station.

17. An apparatus comprising:
   at least one processor; and
   at least one memory including a computer program code, wherein the at least one memory and the computer program code are configured, with the at least one processor, to cause a large area cell base station of a cellular communication system to:
   establish a control connection with a plurality of small area cell base stations in a coverage area of the large area cell base station, at least a first small area cell base station and a second small area cell base station of the plurality of small area cell base stations belonging to two different network operators;
   allocate, based on a dynamic spectrum sharing policy associated with co-primary spectrum for the plurality of small area cell base stations, time-frequency resources to one or more of the plurality of small area cell base stations from a frequency band of the co-primary spectrum shared by the plurality of small area cell base stations; the co-primary spectrum being jointly used by the different network operators and transmit one or more time-frequency resource allocation messages indicating the allocated time-frequency resources from the frequency band shared by the plurality of small area cell base stations.

18. An apparatus comprising:
   at least one processor; and
   at least one memory including a computer program code, wherein the at least one memory and the computer program code are configured, with the at least one processor, to cause the apparatus to cause a small area cell base station of a cellular communication system to:
   establish a control connection with a large area cell base station detected by the small area cell base station to control dynamic spectrum sharing policy associated with co-primary spectrum for a plurality of small area cell base stations from a frequency band of the co-primary spectrum shared by the plurality of small area cell base stations, at least a first small area cell base station and a second small area cell base station of the plurality of small area cell base stations belonging to different network operators, and the co-primary spectrum being jointly used by the different network operators;
   determine a need by the small area cell base station for frequency resources from the frequency band shared by the plurality of small area cell base stations;
   in response to said determining, negotiate with the large area cell base station about allocation of the frequency resources to the small area cell base station from the frequency band of the co-primary spectrum shared by the plurality of small area cell base stations, wherein causing the apparatus to negotiate comprises causing the small area cell base station to receive from the large area cell base station a time-frequency resource allocation message indicating a time-frequency resource allocated by the large area cell base station to the small area cell base station from the frequency band shared by the plurality of small area cell base stations.

19. A computer program product, the computer program product being tangibly embodied on a non-transitory computer-readable storage medium and including instructions that, when executed by at least one processor, are configured to perform the method of claim 1.

20. A method comprising:
   establishing, by a large area cell base station of a cellular communication system, a control connection with one or more small area cell base stations in a coverage area of the large area cell base station, at least one small area cell base station of the one or more small area cell base stations and the large area cell base station belonging to different network operators;
   allocating, by the large area cell base station based on a dynamic spectrum sharing policy associated with co-primary spectrum for the one or more small area cell base stations, time-frequency resources to the one or more small area cell base stations from a frequency band of the co-primary spectrum shared by the one or more small area cell base stations, the co-primary spectrum being jointly used by the different network operators; and
   transmitting, by the large area cell base station, one or more time-frequency resource allocation messages indicating the allocated time-frequency resources from the frequency band shared by the one or more small area cell base stations.

* * * * *